Patented Nov. 22, 1932

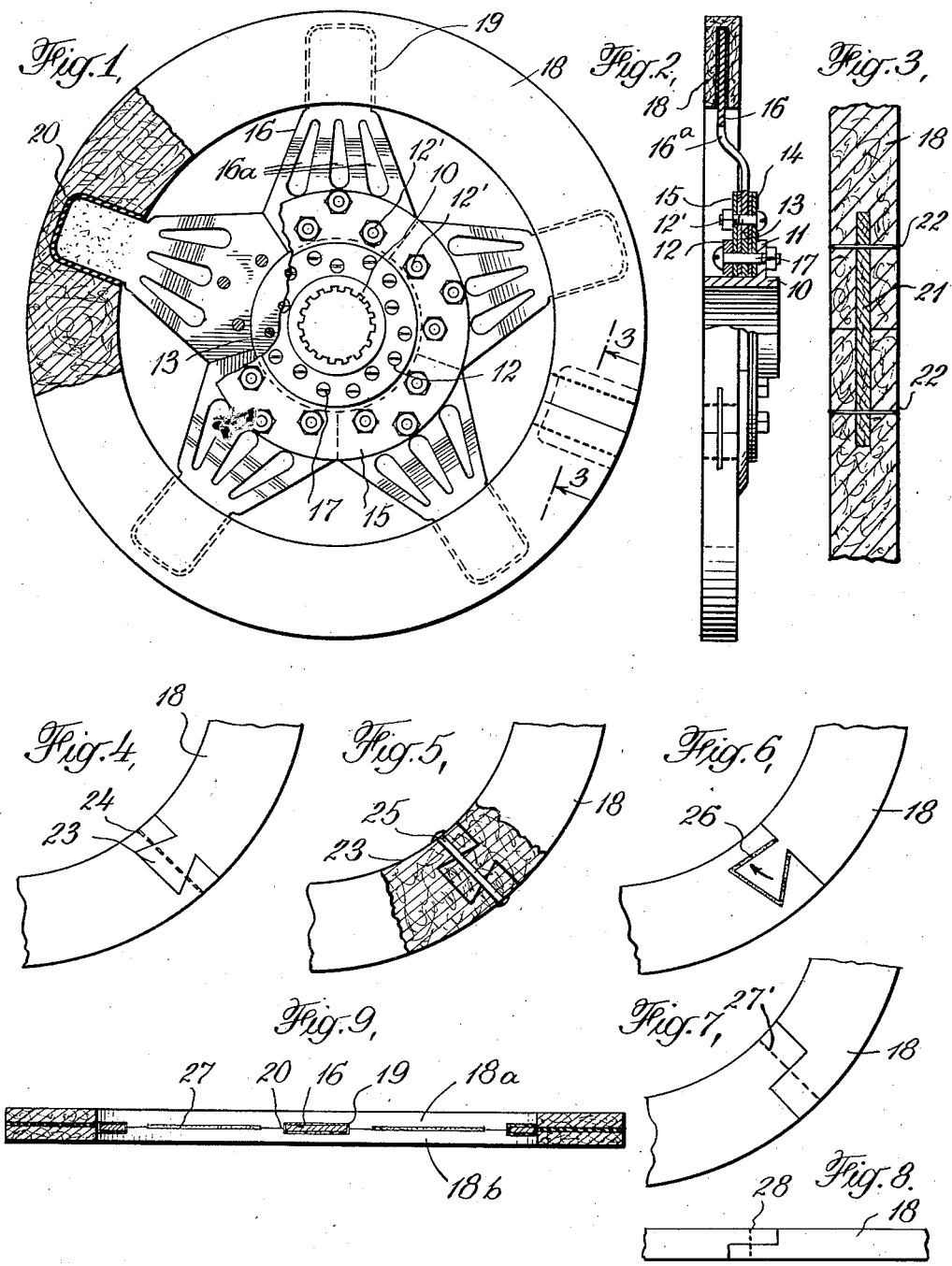

1,888,779

UNITED STATES PATENT OFFICE

ELMER V. J. TOWER, OF NORTH SYRACUSE, NEW YORK, ASSIGNOR TO RUSSELL MANUFACTURING COMPANY, OF MIDDLETOWN, CONNECTICUT, A CORPORATION OF CONNECTICUT

FRICTION TRANSMITTING ELEMENT

Application filed January 12, 1928. Serial No. 246,124.

This invention relates to friction clutches of the type now used in automobiles and other motor driven road vehicles, and is concerned particularly with transmitting elements used in such clutches to effect the frictional connection between the driving and driven members of the clutch mechanism. In clutches as commonly constructed for automobile installation, the fly wheel of the motor is used as the driving member and is suitably formed with a friction surface adapted to be engaged by a transmitting element mounted on the propeller shaft which receives power when the element is forced into engagement with the surface of the fly wheel. The friction transmitting element ordinarily consists of a more or less rigid disc carrying a strip or ring of friction material, which is forced into tight contact with the surface of the fly wheel by means of a spring-actuated presser plate controlled by the driver's foot pedal, or the like.

Inasmuch as automobile clutches are operated under especially severe conditions due to the loads which they must transmit and also because of the incessant shocks and jars to which they are subjected in use, they must be of strong and rugged construction so that they will operate satisfactorily without slipping and seizing and can be used for long periods without requiring repair or replacement of parts. This construction of the clutch parts naturally gives them considerable inertia in starting and stopping which if not properly absorbed, causes heavy shocks and chattering with eventual damage to the clutch parts as well as discomfort to the occupants of the vehicle. Damage to the parts so incurred can be remedied only by dismantling the entire clutch and replacing such parts as are injured, and involves considerable expense for labor and materials.

The principal object of the present invention is to provide a transmitting element which acts to absorb shocks and jars, so that smooth and uniform operation is obtained and strain on the clutch parts, the engine, and the propeller shaft and its associated parts is eliminated. To accomplish this purpose I construct the element so that it has a considerable degree of flexibility and elasticity, and is self-aligning and self-conforming with respect to the operating surfaces. Such flexibility and elasticity acts to take up or absorb shocks and jars developed during operation which are, in most clutches as now made, transmitted directly through the element to the hub and shaft.

In carrying out my invention, I use on the new transmitting element a flexible supporting structure adapted to be mounted on the propeller shaft and preferably including a plurality of spokes attached to a hub in such manner that their mounting thereon is flexible. Disposed on the end of the spokes is the friction ring which may be of woven friction material, or molded material of the type commonly known as "fibre", and this ring is mounted on the spokes by connections which are yielding to an effective degree. These connections include no metal securing means such as the rivets now commonly employed, to secure the friction ring to the usual more or less rigid disc. As a consequence, vibration, strains and shocks which originate at the place of contact of the friction material with the driving and driven members are damped and absorbed by the connections immediately, and before there is any substantial transmission of such vibration, strains and shocks to the supporting structure. Further absorption and damping action are brought about by the flexible and resilient construction of the transmitting member, so that the total effect is to eliminate such vibrations and shocks almost entirely.

The new transmitting member includes many novel features of construction which will be further pointed out in detail in connection with the accompanying drawing, in which Figure 1 is a face view partially in section of the friction transmitting element of this invention;

Fig. 2 is a side view, shown in partial section, of the element illustrated in Figure 1;

Fig. 3 is a section of the friction ring taken along the line 3—3 of Figure 1;

Figs. 4, 5, 6, 7 and 8 illustrate various methods of joining the two ends of the friction ring, whereby the faces thereof form continuous friction surfaces which are entirely devoid of metallic projections or the like; and Fig. 9 is a transverse section of a friction ring made in laminated form showing provision for providing flexibility between the several laminations.

The new transmitting element includes the hub 10 which is adapted to be splined upon the propeller shaft for axial movement with respect thereto. This hub is formed with a flange 11 between which and a separate flanged collar 12 is adapted to be clamped against relative movement a ring or washer 13 of non-metallic material such as asbestos fabric, etc. The opposite sides of this ring 13 are engaged by pairs of metal washers 14 and 15 which are securely attached to hub 10 and collar 12 by bolts 17 or rivets and also to the hub ends of spokes 16 by means of bolts 12' or rivets. These hub ends of the spokes are curved to engage the periphery of the ring 13 and are also tapered radially so that the side edges of adjacent spokes are in contact with one another as shown in Figure 1. The spokes are preferably provided with slots or openings 16a which lend greater elasticity and flexibility thereto and if desired, the spoke structure may be off-set and disposed in two planes, one of which may be termed the plane of the hub 11 and the other the plane of the friction ring 18, this offset allowing the flexible spokes to twist to a slight extent.

This friction ring 18 is preferably made of somewhat flexible material such as woven asbestos or molded fiber, and is formed either in one piece as shown in Figs. 1, 2 and 3, or laminated as shown in Fig. 9. In any case it is preferred that the ring 18 be provided with pockets 19 which open into the inner periphery of the ring and preferably do not extend through the outer periphery thereof. The ends of the spokes are so shaped as to fit into these pockets 19, but a small space is provided between the sides and ends of the pocket and the sides and ends of the spoke. The friction ring thus has a limited freedom of movement with respect to the spoke structure, which serves to absorb shocks and jars. To add to the effectiveness of the connection, elastic material 20 may be introduced into the space between the spokes and the friction ring 18, the material used being an elastic cement which may be applied to the ends of the spokes before they are inserted in the pockets. It is preferable that the flexible material 20 cover the faces of the spokes which enter the pockets in the ring 18 so that additional flexibility at an angle to the plane of rotation of the clutch is also obtained.

The friction material used is preferably not a complete endless ring in order that it may be readily mounted in place. The ends must therefore be joined in such a way that uniform and continuous surfaces are provided on both faces of the ring. Various methods of fastening the free ends of the ring, so that the surfaces are devoid of metallic projections or metallic surfaces, are shown in Figs. 3 to 8 inclusive. In Fig. 3, which is a cross section of the joint of the friction ring 18 as shown in Fig. 1, the free ends of the friction element 18 are formed with pockets and a joining member 21 consisting of flexible but preferably non-elastic material such as canvas or the like, is inserted in the aligned pockets and sewn in position by means of stitching 22. Thus no metallic joining members such as rivets are used and the two faces of friction ring 18 present uniform and continuous friction surfaces of the same material. In Fig. 4, the ends of the friction ring 18 are dove-tailed and fitted together so that the tenon 23 of the dove-tail may be sewn in place by means of stitching 24. In Fig. 5, the same arrangement is illustrated except that the stitching is replaced by a rivet or staple 25 which passes through the dove-tail tenon 23 and lies in the body of the material between the friction surfaces of the ring. In order to prevent any distortion of the joint in the friction ring 18 due to the centrifugal force of rotation which would tend to cause the end portions of the ring to bulge radially outwardly, the dove-tail joint may be distorted (Fig. 6) so that the end portions of the ring have a tendency to turn inwardly in the direction of the arrow. Accordingly, the centrifugal force of rotation will tend to straighten out the ring 18 during operation of the clutch. In Fig. 6 is also shown a method of fastening the dove-tail joint by means of elastic material such as rubber cement 26 or the like, instead of employing the stitching 22 and 24 or the rivet 25 shown in Figs. 3 to 5 inclusive. In Fig. 7 is illustrated an end lap joint fastened by stitching 27', whereas in Fig. 8 a face lap joint fastened by stitching 28 is illustrated. Obviously any form of fastening illustrated may be substituted for another form and the several methods of fastening may be combined, if desired.

Fig. 9 illustrates a modified form of the friction ring which consists of two laminations 18a and 18b of ring form, these laminations being recessed to provide pockets 19 for the reception of spokes 16. Between the ends of the spoke pockets 19 the opposed faces of laminations 18a and 18b are provided with depressions which form a substantial space in the ring structure. This space is filled with elastic binding material such as rubber cement 27, which acts as a flexible connection between laminations 18a and 18b whereby a slight relative movement within prescribed limits is obtainable between the opposite faces of the ring during operation of the clutch. In this form of friction ring therefore, added elasticity is imparted to the friction transmitting element as a whole and in addition all stitching, riveting and the like is dispensed with.

It will be seen that in the new transmitting element, the friction ring is secured to its supporting structure without the use of rivets or other similar rigid connections which would result in direct transmission to the structure of vibrations, shocks and jars arising from seizing or slipping. Due to the manner in which the ring is mounted in place on the spokes, such shocks and jars are absorbed in the connection as well as in the structure itself. The spokes of the structure being slotted and offset may twist slightly under operating conditions thus relieving vibration, shock or undue strain, with the result that a clutch in which the new element is installed operates more smoothly than the ordinary clutch having a disc transmitting member, and also has a longer life and can be used with greater comfort to occupants of the vehicle.

By reason of the flexibility and elasticity of the new element, the cost of the clutch is further reduced, since the element conforms readily to slight irregularities in manufacture and thus does not require the high degree of precision in workmanship ordinarily insisted upon. Also the friction ring can be readily replaced when occasion requires and the ends of the friction material can be easily joined by means which do not impair the smoothness in operation of the clutch. The new element is a complete unit in itself and may be produced and distributed in a few sizes and forms ready for installation in various commercial clutches now in use.

I claim:

1. A transmitting element for friction clutches comprising a supporting structure having a plurality of radially extending members and a ring of friction material secured directly but yieldingly on the outer ends of said members by yieldable means.

2. A transmitting element for friction clutches, comprising a substantially flat ring of friction material, a support for the ring, and means directly connecting the support and the ring, said means being yielding in all directions.

3. A transmitting element for friction clutches, comprising a substantially flat ring of friction material, a support for the ring, and means directly connecting the support and the ring, said connecting means permitting limited freedom of relative movement between the support and ring in the plane of rotation of the element.

4. A transmitting element for friction clutches comprising a friction material member, a spoke structure for supporting the member, and yieldable connections between the member and said structure, said spoke structure having limited flexibility at an angle to the plane of rotation of the element.

5. A transmitting element for friction clutches comprising a ring of friction material, a spoke structure for supporting the material, and resilient connections directly mounting the ring on the spoke structure.

6. A transmitting element for friction clutches comprising a friction member, a flexible spoke structure for supporting the member, and flexible connections between the spokes and the member.

7. A transmitting element for friction clutches, comprising a friction member, a hub, spokes flexibly mounted on the hub, and flexible connections between the spokes and the member.

8. A transmitting element for friction clutches, comprising a friction member, a hub, flexible spokes resiliently mounted on the hub, and flexible connections between the spokes and the member.

9. A transmitting element for friction clutches, comprising a laminated friction member, flexible connections between the laminations permitting a limited relative movement between opposite faces of the member, and a support for the member.

10. A transmitting element for friction clutches, comprising a laminated friction member, flexible connections between the laminations permitting a limited relative movement between opposite faces of the member, a support for the member, and flexible connections between the support and the member.

11. A transmitting element for friction clutches, comprising a laminated friction member, flexible connections between the laminations permitting a limited relative movement between opposite faces of the member, a spoke structure for mounting the member, a hub for mounting the spokes, and flexible connections between the spokes and the member.

12. In a transmitting element for clutches, a friction element formed of a strip of friction material, non-metallic means for connecting the ends of the strip to form a ring thereof, and pockets formed therein for the reception of a support.

13. In a transmitting element for clutches, a friction element formed of a flat strip of woven friction material, a connection for joining the ends of the strip to form a flat ring thereof, the said connection including non-metallic means engaging both ends of the strip, no part of said means extending beyond the flat faces of the ring so formed, and pockets formed therein for the reception of a support.

14. A transmitting element for friction clutches, comprising a supporting structure and a substantially flat ring of fibrous friction material directly but yieldingly secured thereon by yieldable means.

15. A transmitting element for friction clutches, comprising a supporting structure and a substantially flat ring of fibrous friction material directly attached thereto by resilient material.

16. A transmitting element for friction clutches, comprising a substantially flat ring of fibrous friction material, a support for the ring, and elastic means directly mounting the ring on the support.

17. A transmitting element for friction clutches, comprising a substantially flat member of fibrous friction material, a support for the member, and elastic securing means directly mounting the member on the support.

18. A transmitting element for friction clutches comprising a substantially flat ring of friction material, a support for the ring, and means independent of said ring, directly connecting the support and the ring, said means being elastic in the plane of rotation of the element.

In testimony whereof I affix my signature.

ELMER V. J. TOWER.